Patented Nov. 9, 1948

2,453,298

UNITED STATES PATENT OFFICE 2,453,298

SYNTHETIC RESINS AND PREPARATION THEREOF BY REACTING AN ALKYL BENZENE, A PHENOLIC COMPOUND, AND A DIHALOALKANE

Herman S. Bloch, Chicago, Ill., assignor to Universal Oil Products Company, Chicago, Ill., a corporation of Delaware No Drawing. Application August 20, 1945, Serial No. 611,702

15 Claims. (Cl. 260—61)

This application is a continuation-in-part of my copending application Serial No. 500,425 filed August 28, 1943, now abandoned.

This invention relates to the preparation of resins suitable for use as coating compositions.

An object of this invention is the preparation of a resin by the interaction of an alkylbenzene hydrocarbon, a phenol, and a dihaloalkane in the presence of a Friedel-Crafts metal halide catalyst.

Another object of this invention is the preparation of a resin by reacting an alkylbenzene having not more than 2 alkyl substituents, a monohydric phenol, and a dichloride of a normally gaseous olefin in the presence of a Friedel-Crafts metal chloride catalyst.

One specific embodiment of the present invention relates to a process for producing a resin which comprises reacting in the presence of a Friedel-Crafts metal halide catalyst an alkylbenzene hydrocarbon having not more than 2 alkyl groups and not more than 2 carbon atoms in each of said alkyl groups, a phenolic compound having per aromatic ring not more than 2 oxygen atoms and not more than 2 alkyl groups, each of said alkyl groups containing not more than 2 carbon atoms, and a dihaloalkane with 2 to 4, inclusive, carbon atoms per molecule and halogen atom of at least 35 atomic weight bound to each of 2 carbon atoms which are adjacent in said dihaloalkne.

Another specific embodiment of the present invention relates to a process for producing a resin which comprises reacting in the presence of a Friedel-Crafts metal halide catalyst an alkylbenzene hydrocarbon having not more than 2 alkyl groups and not more than 2 carbon atoms in each of said alkyl groups, a phenol having not more than 2 hydroxyl groups and not more than 2 alkyl groups, each of said alkyl groups containing not more than 2 carbon atoms, and a dihaloalkane with 2 to 4, inclusive, carbon atoms per molecule and a halogen atom of at least 35 atomic weight bound to each of 2 carbon atoms which are adjacent in said dihaloalkane.

My invention is concerned particularly with the manufacture of resinous materials, suitable for incorporating into coating compositions, from hydrocarbon fractions containing aromatic hydrocarbons, certain phenolic compounds, and alkylene dihalides containing halogens of at least 35 atomic weight. Resins of this nature which are prepared in part from phenolic materials show improved solubilities in aromatic solvents containing chemically bound oxygen such as esters or ethers over the solubilities of resins derived by the condensation of dihaloalkanes with only aromatic hydrocarbons. When employed in coating compositions, the resins produced from phenols, alkylbenzene hydrocarbons, and dihaloalkanes adhere well to metals and various woods and are more satisfactory and durable than the purely hydrocarbon resins.

The resins formed by my process differ markedly from those previously prepared by condensing an alkali or alkaline earth metal salt of a polyhydric phenol with an organic polyhalide whose halogen atoms are attached to aliphatic carbon atoms. In this prior art method the alkali or alkaline earth metal of the salt of the mentioned polyhydric phenol combines with the halogen of the organic polyhalide and thus forms a metal halide and effects a condensation of the polyhydric phenol with the carbon chain of the organic polyhalide forming an organic condensation product of resinous nature. In my proccess, an alkyl benzene hydrocarbon, a monohydric or dihydric phenol, and a dihaloalkane are interacted in the absence of an alkaline condensing agent but in the presence of a Friedel-Crafts metal halide catalyst to form a resinous material and a hydrogen halide, the latter being evolved from the process.

The aromatic hydrocarbons employed in my process are alkylbenzene hydrocarbons having not more than 2 alkyl groups and not more than 2 carbon atoms in each of said alkyl groups. These alkylbenzene hydrocarbons include toluene, the xylenes, monoethylbenzene, and the diethylbenzenes. The aromatic hydrocarbons used in this process may be either the pure alkylbenzene hydrocarbons or may comprise a substantially saturated hydrocarbon fraction containing these aromatic hydrocarbons in admixture with paraffinic and naphthenic hydrocarbons. Suitable saturated hydrocarbon fractions containing alkylbenzene hydrocarbons may be of naphtha or gasoline boiling range, or of kerosene boiling range. If the alkyl substitutents contain more than 2 carbon atoms, dealkylation occurs and the olefins formed thereby undergo conjunct polymerization with the formation of undesirable by-products.

The phenolic compounds which are reacted with the other resin-forming substances as herein set forth comprise phenols and phenol ethers having per molecule not more than 2 oxygen atoms and not more than 2 nuclearly substituted alkyl groups, each of said alkyl groups containing not more than 2 carbon atoms. The monohydric phenols include particularly phenol, cresols, xylenols, and naphthols, and their methyl and ethyl homologues having not more than 2 nuclear alkyl substituents, resorcinol, catechol, and hydroquinone, and other dihydric phenols and their methyl and ethyl substituted homologues having not more than 2 alkyl groups are dihydric phenols which are useful in my process. Other phenolic compounds utilizable in my process for producing resins comprise methyl aryl ethers and ethyl aryl ethers producible from phenols as well as diaryl ethers wherein the aryl group is a phenyl group or a phenyl group substituted by an alkyl group having not more than 2 carbon atoms and thus including methyl and/or ethyl groups. Typical phenol ethers thus include anisole, phenetole, diphenyl ether, etc.

The alkylene dihalides preferred for use in my process are produced by addition of a halogen to a gaseous mono-olefinic hydrocarbon and particularly to ethylene. These dihaloalkanes contain 2, 3, and 4 carbon atoms per molecule and have a halogen atom of at least 35 atomic weight bound to each of 2 adjacent carbon atoms. Although dichloro-, dibromo-, and di-iodo-alkanes are useful in my process, I prefer to utilize the dichloroalkanes because of their cheapness and availability. Other suitable dihaloalkanes are produced by the halogenation of paraffinic, cycloparaffinic and cyclo-olefinic hydrocarbons.

The use of dihaloalkanes containing from 2 to 4, inclusive, carbon atoms per molecule results in the production of hard resins, while softer resins with softening points below about 65° C. and more tarry products are formed from dihaloalkanes of higher molecular weights.

The charging stock to my process for producing resins should contain at least 10% of the mentioned alkylbenzene hydrocarbons, while the amount of phenolic material present should be from about one-tenth to about one-half of the total amount of aromatic compounds, that is alkylbenzene hydrocarbons plus phenols, present in the mixture. The preferred amount of dihaloalkane present in the reaction mixture also is about 2 to about 5 moles of dihaloalkane per mole of total alkyl aromatic hydrocarbons and phenols if pure alkyl aromatic hydrocarbons and phenols are utilized rather than hydrocarbon fractions containing these materials; but molar ratios of alkylene dihalide to aromatic compounds as low as slightly above 1 and as high as 20 may be used. However, if a naphtha fraction is used, it is preferable to employ the dihaloalkane in sufficient excess so that after the condensation reaction is completed, the molar ratio of the unconsumed dihaloalkane to the total of the paraffinic and naphthenic hydrocarbons present in the reaction mixture is greater than 2.

Catalysts employed in my process comprise the metal halides of the Friedel-Crafts type and include particularly aluminum chloride, aluminum bromide, ferric chloride, ferric bromide, etc. In addition to the metal halide catalysts, boron fluoride is also suitable. In general, the amount of catalyst employed is from about 5 to about 15 mole % more than the amount of phenolic compound charged to the reaction mixture.

In the presence of these catalysts, the condensation reaction is carried out at a temperature of from about 25° to about 200° C. and preferably at a temperature of from about 50° to about 100° C. While the condensation occurs at atmospheric pressure, it is sometimes advantageous to effect the condensation at a superatmospheric pressure.

The reaction is preferably carried out for a length of time such that the amount of hydrogen halide evolved ranges from about 1.1 to about 1.9 moles per mole of total aromatics (phenols plus hydrocarbons) used. The soft resinoids formed when the amount of hydrogen chloride evolved is in the lower portion or below this range may be hardened by reaction of the resinoid, after hydrolysis of the reaction mixture, with formaldehyde or similar aldehyde or ketone condensation agents. Such aldehyde condensations may be carried out in either alkaline or acid media.

In carrying out the process of the present invention, a mixture of an aromatic hydrocarbon or a hydrocarbon fraction containing aromatics and a phenolic compound is commingled with a molar excess of a dihaloalkane, also referred to as an alkylene dihalide, and is heated in the presence of a Friedel-Crafts metal halide catalyst, preferably aluminum chloride, until the evolution of hydrogen chloride bears a ratio of about 1.5 moles per mole of total aromatic compound employed, the total aromatic compound including both alkylbenzene hydrocarbons and phenolic compounds. The reaction mixture is then subjected to hydrolysis and the aqueous layer is separated from the organic material. The unreacted constituents of the materials charged to the process are then separated, preferably by steam distillation, and the plastic residue is heated to a temperature of from about 90° to about 210° C. until frothing has ceased. The resulting material, upon cooling, normally sets to a hard, pale clear resin having good solubility in hydrocarbon solvents, in chlorinated hydrocarbons, and in lacquer solvents of the ester, ketone, glycol ester, and glycol ether types.

The separation from the resin of unreacted materials such as excess dihaloalkane, phenol, phenol ethers, or non-aromatic hydrocarbons (in cases where naphtha fractions are employed instead of pure hydrocarbons) is preferably carried out by steam distillation rather than by ordinary distillation, unless the latter is carried out at a subatmospheric pressure. Distillation of the reaction mixture at atmospheric pressure causes darkening of the desired resinous product.

In an alternative method of procedure, the phenolic compound is added to the reaction mixture after partial condensation has been effected between the alkylbenzene hydrocarbon and the dihaloalkane. A smaller amount of catalyst is needed when following this method of operation, but greater care is required to obtain a homogeneous resinous product having satisfactory properties.

The following examples are introduced to illustrate the process of this invention, although with no intention of unduly limiting its generally broad scope.

*Example I*

An attempt was made to prepare a resin by reacting phenol and ethylene dichloride in the absence of any aromatic hydrocarbons. Phenol was combined with ethylene dichloride in the presence of aluminum chloride, the initial ratio of the reactants being 2.5 moles of ethylene dichloride per mol of phenol. The reaction mixture was heated at a temperature varying between 55° and 94° C. until the mole ratio of ethylene dichloride to aromatics reacted was equal to 1.14. The product was a black, tarry liquid which was not convertible to a resinous material.

Example II

A charging stock comprising 0.66 mole of xylenes, 0.33 mole of phenol, and 2.5 moles of ethylene dichloride was heated in the presence of one mole of aluminum chloride at a temperature of 60° C. The reaction was stopped when the molecular ratio of ethylene dichloride to total aromatics reacted was 1.75. The product was a brittle, reddish-brown solid having a softening point of 90° C., with high solubility in aromatic hydrocarbons, carbon tetrachloride and oxygen-containing organic solvents.

Example III

To a mixture of a straight run naphtha cut rich in xylenes and phenol in such quantity that the xylene to phenol ratio was 3:1 was added ethylene dichloride in an amount equal to 1.9 moles per mole of total aromatics (xylene plus phenol). Condensation was effected between the reactants by the addition of aluminum chloride. After the reaction had proceeded at 60° C. until 1.32 moles of hydrogen chloride had been evolved per mole of total aromatic compounds, the reaction mixture was decomposed in the usual manner. The recovered resin, which was highly soluble in organic solvents and vegetable oils, had a ball and ring softening point of 81° C.

Example IV

A mixture comprising 0.5 mole of xylenes and 0.5 mole of anisole together with 2.5 moles of ethylene dichloride was reacted in the presence of 0.63 mole of aluminum chloride at a temperature ranging between 60° and 95° C. The reaction was stopped when the molecular ratio of ethylene dichloride to total aromatic compounds reacted was 1.09. The product was a yellow solid having a softening point of 96° C. with fair solubility in organic solvents.

Example V

A mixture comprising xylenes and phenol in the molar ratio of 3:1 was mixed with ethylene dichloride, the molar ratio of the latter to the xylenes present being 2.5. The reaction proceeded in the presence of aluminum chloride at a temperature of 60° C. until the molecular ratio of hydrogen chloride recovered per mole of xylene reacted was 1.76. The product had excellent solubility and was found to have a softening point of 81° C. When the reaction was conducted until 1.95 moles of hydrogen chloride were evolved, the product was granular, not thermoplastic, and almost insoluble in organic solvents.

Example VI

In this run, xylenes were partially reacted with the ethylene dichloride before the phenol was added. The reaction mixture comprised three moles of xylene per mole of phenol and 2.5 moles of ethylene dichloride per mole of xylene plus phenol. The reaction was effected in the presence of 0.30 mole of aluminum chloride based on the xylene present until partial condensation had been effected between the xylenes and ethylene dichloride, as evidenced by the evolution of slightly over 1 mole of hydrogen chloride per mole of xylenes. The phenol was then added, and the reaction was continued at 60° C. until a total of 1.74 moles of hydrogen chloride were recovered per mole of total aromatics present. The product was a soft, semisolid of high solubility but no definite softening point. When the reaction was conducted until 1.95 moles of hydrogen chloride were evolved, the product was a granular insoluble solid.

The foregoing specification and examples illustrate the novelty and utility of the present process, although neither section is introduced with the intention of limiting unduly its generally broad scope.

I claim as my invention:

1. A process for producing a three component resin which comprises reacting in the presence of a Friedel-Crafts metal halide catalyst: (1) an alkylbenzene hydrocarbon having not more than two alkyl groups per molecule and each of said alkyl groups having not more than two carbon atoms per group, (2) a phenolic compound selected from the group consisting of monohydric phenols, dihydric phenols and the methyl, ethyl and phenyl ethers of said phenols, said phenolic compound containing not more than two nuclearly substituted alkyl groups per molecule as the sole nuclear substitutents and each of said alkyl groups having not more than two carbon atoms per group, and (3) a dihaloalkane having from two to four, inclusive, carbon atoms per molecule and a halogen atom of at least 35 atomic weight bound to each of two adjacent carbon atoms; the amount of catalyst being at least 5 mol percent more than (2), the amount of (1) being at least 10% of the total of (1), (2), and (3), the amount of (2) being being from about $\frac{1}{16}$ to about ½ of the total of (1) and (2), and the amount of (3) being from above one to about twenty mols per mol of total (1) and (2); and terminating the reaction when from about 1.1 to about 1.9 mols of hydrogen halide have been evolved per mole of total (1) and (2).

2. The process of claim 1 further characterized in that said reaction is effected at a temperature of from about 25° C. to about 200° C.

3. The process of claim 1 further characterized in that said reaction is effected at a temperature of from about 50° C. to about 100° C.

4. The process of claim 1 further characterized in that the amount of (3) is from about two to about five mols per mol of total (1) and (2).

5. The process of claim 1 further characterized in that the resultant reaction mixture is hydrolyzed to form an aqueous layer and an organic material, the aqueous layer is separated, the organic material is steam distilled to separate unconverted reactants, and the resultant plastic residue is heated at a temperature of from about 90° C. to about 210° C.

6. The process of claim 1 further characterized in that said catalyst comprises aluminum chloride.

7. The process of claim 1 further characterized in that said dihaloalkane comprises a dichloroalkane.

8. The process of claim 1 further characterized in that said phenolic compound comprises a monohydric phenol.

9. The process of claim 1 further characterized in that said alkylbenzene hydrocarbon comprises a xylene.

10. The process of claim 1 further characterized in that said dihaloalkane comprises ethylene dichloride.

11. A process for producing a three component resin which comprises reacting xylene, phenol, and ethylene dichloride in the presence of aluminum chloride at a temperature of from about 50° C. to about 100° C.; the amount of aluminum chloride being at least 5 mol percent more than the amount of phenol, the amount of said xylene being at least 10% of the total reactants, the amount of said phenol being from about $\frac{1}{10}$ to about ½ of the total aromatic reactants, and the amount of said ethylene dichloride being from above one to about twenty mols per mol of total aromatic reactants; and terminating the reaction when from about 1.1 to about 1.9 mols of hydrogen chloride have been evolved per mol of total aromatic reactants.

12. A process for producing a three component resin which comprises reacting xylene, anisole, and ethylene dichloride in the presence of aluminum chloride at a temperature of from about 50° C. to about 100° C.; the amount of aluminum chloride being at least 5 mol percent more than the amount of anisole, the amount of said xylene being at least 10% of the total reactants, the amount of said anisole being from about $\frac{1}{10}$ to about ½ of the total aromatic reactants, and the amount of said ethylene dichloride being from above one to about twenty mols per mol of total aromatic reactants; and terminating the reaction when from about 1.1 to about 1.9 mols of hydrogen chloride have been evolved per mol of total aromatic reactants.

13. A resin produced according to the process of claim 1.

14. A resin produced according to the process of claim 11.

15. A resin produced according to the process of claim 12.

HERMAN S. BLOCH.

REFERENCES CITED

The following references are of record in the file of this patent:

UNITED STATES PATENTS

| Number | Name | Date |
| --- | --- | --- |
| 2,060,715 | Arvin | Nov. 10, 1936 |
| 2,154,192 | Zinke | Apr. 11, 1939 |
| 2,184,325 | Sweeney et al. | Dec. 26, 1939 |
| 2,265,847 | Laughlin et al. | Dec. 9, 1941 |